United States Patent
Huang et al.

(10) Patent No.: US 11,634,033 B2
(45) Date of Patent: Apr. 25, 2023

(54) SYSTEMS AND METHODS OF VEHICULAR BRAKING

(71) Applicant: NIO Technology (Anhui) Co., Ltd., Anhui (CN)

(72) Inventors: Xiaoyu Huang, San Jose, CA (US); Aaron R. Bailey, Mountain View, CA (US); Bruno M. Barthelemy, Los Gatos, CA (US)

(73) Assignee: NIO Technology (Anhui) Co., Ltd., Heifei (CN)

( * ) Notice: Subject to any disclaimer, the term of this patent is extended or adjusted under 35 U.S.C. 154(b) by 414 days.

(21) Appl. No.: 16/781,736

(22) Filed: Feb. 4, 2020

(65) Prior Publication Data

US 2021/0237583 A1 Aug. 5, 2021

(51) Int. Cl.
| | |
|---|---|
| *B60L 7/26* | (2006.01) |
| *B60T 1/10* | (2006.01) |
| *B60T 1/06* | (2006.01) |
| *B60L 7/18* | (2006.01) |
| *B60K 7/00* | (2006.01) |

(52) U.S. Cl.
CPC .............. *B60L 7/26* (2013.01); *B60L 7/18* (2013.01); *B60T 1/065* (2013.01); *B60T 1/10* (2013.01); *B60K 7/0007* (2013.01); *B60K 2007/0038* (2013.01); *B60T 2270/604* (2013.01)

(58) Field of Classification Search
CPC .......... B60T 13/586; B60T 2270/604; B60T 2270/608; B60T 8/267; B60L 7/24; B60L 7/26; B60W 30/18127
See application file for complete search history.

(56) References Cited

U.S. PATENT DOCUMENTS

| | | | | | |
|---|---|---|---|---|---|
| 5,246,276 | A | * | 9/1993 | Pajonk | B60T 8/26 303/113.5 |
| 5,399,000 | A | * | 3/1995 | Aoki | B60L 7/26 303/3 |
| 5,632,534 | A | * | 5/1997 | Knechtges | B60T 13/74 303/3 |
| 5,973,463 | A | * | 10/1999 | Okuda | B60L 15/2036 701/4 |

(Continued)

FOREIGN PATENT DOCUMENTS

WO     WO 2018/210534     11/2018

OTHER PUBLICATIONS

Winge, J.L., "Disk brakes for American Cars", SAE Transactions, 1964, vol. 72 (1964), pp. 35-46 (Year: 1964).*

(Continued)

*Primary Examiner* — David A Testardi
(74) *Attorney, Agent, or Firm* — Sheridan Ross, PC

(57) ABSTRACT

An electric vehicle braking system including a braking controller, a front braking system, and a rear braking system. The front braking system includes a front friction brake and a front regenerative braking system. The rear braking system includes a rear regenerative braking system and excludes a friction brake. The braking controller is configured to detect the front regenerative braking has reached a maximum force, detect additional deceleration is required, and, in response to detecting the front regenerative braking has reached the maximum force and detecting additional deceleration is required, apply the front friction brake.

11 Claims, 7 Drawing Sheets

(56) References Cited

U.S. PATENT DOCUMENTS

| | | | | |
|---|---|---|---|---|
| 6,406,105 | B1* | 6/2002 | Shimada | B60L 7/26 303/152 |
| 9,266,511 | B2 | 2/2016 | Pihl et al. | |
| 2002/0030408 | A1* | 3/2002 | Niwa | B60W 20/13 903/918 |
| 2002/0180266 | A1* | 12/2002 | Hara | B60K 6/543 903/918 |
| 2003/0117012 | A1* | 6/2003 | Anwar | B60L 7/26 303/20 |
| 2004/0238244 | A1* | 12/2004 | Amanuma | B60L 7/26 903/917 |
| 2005/0159871 | A1* | 7/2005 | Nakamura | B60K 6/52 303/121 |
| 2006/0055239 | A1* | 3/2006 | Crombez | B60W 10/08 303/152 |
| 2006/0131956 | A1* | 6/2006 | Matsuura | B60T 8/3655 303/152 |
| 2007/0018499 | A1* | 1/2007 | Kokubo | B60L 7/14 303/151 |
| 2007/0029874 | A1* | 2/2007 | Finch | B60T 1/10 303/152 |
| 2008/0100129 | A1* | 5/2008 | Lubbers | B60W 20/13 303/113.1 |
| 2008/0228368 | A1* | 9/2008 | Fuhrer | B60W 30/18127 701/81 |
| 2010/0113215 | A1* | 5/2010 | Jager | B60T 8/17616 477/29 |
| 2011/0303497 | A1* | 12/2011 | Gaffney | B60T 7/042 188/106 P |
| 2012/0055744 | A1* | 3/2012 | Chen | B60W 30/02 188/106 P |
| 2014/0074369 | A1* | 3/2014 | Kim | B60L 7/26 701/70 |
| 2014/0333123 | A1* | 11/2014 | Kunz | B60T 8/4072 303/3 |
| 2016/0059705 | A1* | 3/2016 | Kim | B60T 8/1701 701/22 |
| 2016/0167527 | A1* | 6/2016 | Jeon | B60L 7/26 701/70 |
| 2016/0264111 | A1* | 9/2016 | Doi | B60T 8/267 |
| 2018/0086209 | A1* | 3/2018 | Jeon | B60T 8/17 |
| 2018/0370508 | A1* | 12/2018 | Park | B60T 8/1766 |
| 2019/0106110 | A1* | 4/2019 | Yoshida | B60L 7/26 |
| 2019/0263413 | A1* | 8/2019 | Hancock | B60W 30/02 |
| 2020/0189398 | A1* | 6/2020 | Suzuki | B60T 8/1766 |
| 2020/0353930 | A1* | 11/2020 | Lee | B60W 10/188 |
| 2021/0101598 | A1* | 4/2021 | Kim | B60L 7/26 |

OTHER PUBLICATIONS

Zhang, Xudong et al., "A Novel Driving and Regenerative Braking Regulation Design Based on Distributed Drive Electric Vehicles," 2016 IEEE Vehicle Power and Propulsion Conference (VPPC), 2016, pp. 1-6. (Year: 2016).*

Yang, Yang et al., "A pressure-coordinated control for vehicle electro-hydraulic braking systems", Energies 2018, 11,2336; MDPI, doi:10.3390/en11092336, 22 pages (Year: 2018).*

Westbrook, "Here's How Electronic Parking Brakes Work," Jalopnik Explains, Aug. 8, 2018, retrieved from https://jalopnik.com/heres-how-electronic-parking-brakes-work-1828204278, 8 pages.

Gable et al., "How Does Regenerative Braking Work?," ThoughtCo., Dec. 26, 2018, retrieved from https://www.thoughtco.com/how-does-regenerative-braking-work-85465, 2 pages.

* cited by examiner

|  | Option 1 | Option 2 |
|---|---|---|
| EM | 2 Front + 2 Rear | 1 or 2 Front + 2 Rear |
| Brake-by-Wire | EHB or EBB Front | EMB (MoC) Front |
| Main Brake | Regen | Regen |
| Second Brake | EHB or EBB Front | EMB Front |
| Parking Brake | EPB Front | EMB Front |
| ABS/ESC | 4 Regen | 2 MoC Front + 2 Regen Rear |
| Front Conf. | Regen + EHB/EBB + EPB | Regen + EMB |
| Rear Conf. | Regen | Regen |
| Advantages | Redundancy; HW more ready | Simpler |

Fig. 3

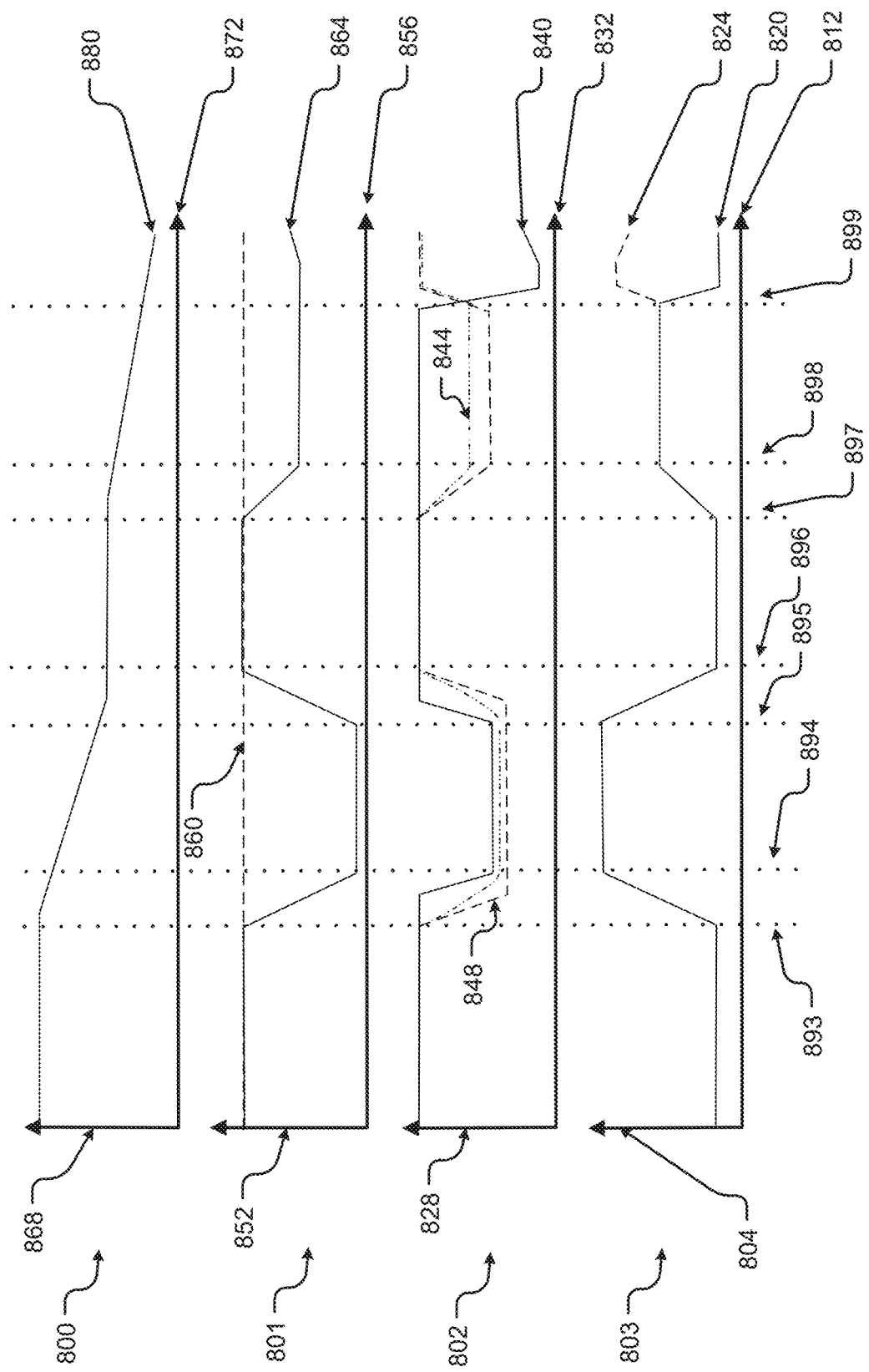

SYSTEMS AND METHODS OF VEHICULAR BRAKING

FIELD

The present disclosure is generally directed to braking systems and methods for vehicles, in particular, toward braking systems and methods combining regenerative braking systems (RBS) and front friction brakes.

BACKGROUND

Conventional electric vehicle (EV) braking systems include sub-systems such as hydraulic systems, electric booster, friction generation components (e.g., pads, rotors, calipers), motor-on-calipers (MoCs), electric parking brakes (EPBs), regenerative braking systems (RBSs), and brake controllers. Many different configurations may be used, but each differs only slightly in the combination of these sub-systems, packaging, and specifications. One common configuration is to have friction brakes in all four corners or wheels of a vehicle and EPB on the rear axle. RBS is not configured to be a main service brake. RBS only functions as an auxiliary brake usually bearing a fixed or mapped ratio to the friction brakes, and the maximum braking torque can be generated is limited. RBS may also be activated in the one-pedal driving/braking system. In addition, chassis controls rely heavily on the friction brakes. It is commonly adopted that whenever a control (e.g., ABS or ESC) is triggered, RBS is disabled.

Some conventional systems boast high rates of maximum deceleration (e.g., 0.3 g) via pure regenerative braking. Such systems combine a brake-by-wire (BbW) system with an RBS, and adopt a series braking strategy (i.e., only applying regenerative up to a maximum rate and then blend in friction brakes on other axles when a requested deceleration is higher than 0.3 g. However, such systems require friction brakes on all four corners or wheels and the RBS is not used as the main service brake.

BRIEF DESCRIPTION OF THE DRAWINGS

FIG. 3 is a chart illustrating options in accordance with one or more embodiments of the present disclosure;

FIG. 8 is a set of charts illustrating aspects of one or more embodiments of the present disclosure.

DETAILED DESCRIPTION

Figure 1:
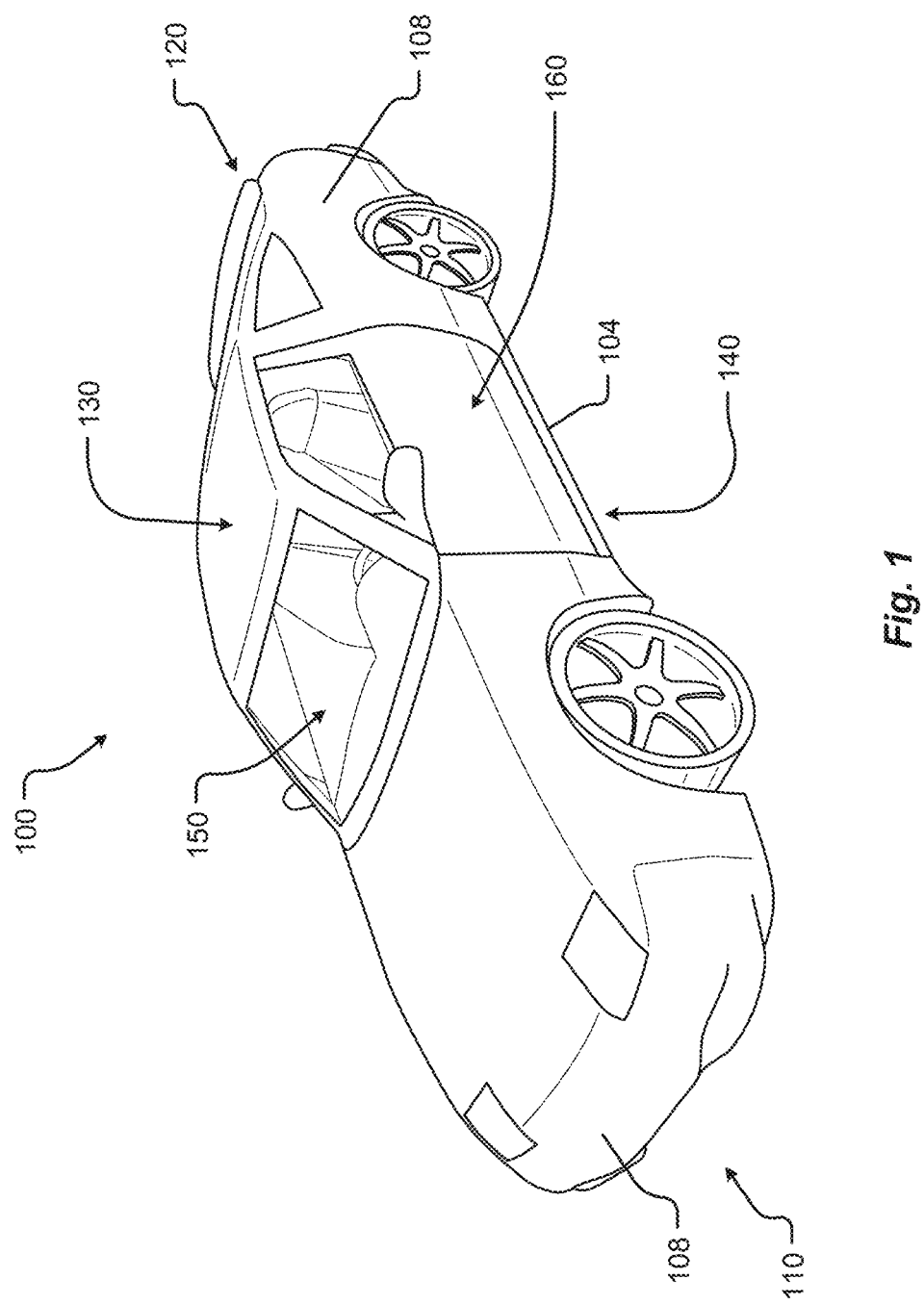
FIG. 1 shows a vehicle in accordance with embodiments of the present disclosure.

Embodiments of the present disclosure will be described in connection with a vehicle, and in some embodiments, an electric vehicle, rechargeable electric vehicle, and/or hybrid-electric vehicle and associated systems.

As discussed above, conventional braking systems of vehicles require friction brakes on all four corners of a vehicle and do not use regenerative braking systems (RBSs) as main service brakes. Such systems fail to take full advantage of the possibilities of RBS braking and, as discussed below, incur significant costs than are required by the systems and methods described herein. What is needed is a braking system for a vehicle which does not require friction brakes on every corner of the vehicle, and which takes full advantage of RBS braking.

As described herein, a novel architecture may be used which combines RBS with front friction brakes and without requiring rear friction brakes. Rear friction brakes, including brake pads, rotors, and calipers, are no longer needed. This new braking system is simpler, highly energy efficient, and can potentially achieve better chassis control performance.

The present disclosure involves a novel architecture combining an RBS with front friction brakes, based on the assumption that there are two motors in the rear, one for each rear wheel. In some embodiments, there may be separate motors for each of the front wheels or a single motor for both front wheels.

In certain embodiments, the RBS is designed to be the main service brake and the front friction brakes may be activated under certain circumstances such as hard braking (e.g., deceleration over 0.5 g), emergency braking, braking while parking, etc. In some embodiments, a series braking strategy may be used.

As described herein, when a deceleration request gets higher, the maximum available braking force that can be provided by the rear axle alone decreases due to weight transfer. To prevent rear wheels locking up before front wheels under various conditions, brake torque allocation among all four wheels may be designed to meet Federal Motor Vehicle Safety Standards (FMVSS) 135 requirements.

For example, FMVSS 135 specifies requirements for service brake and associated parking brake systems for light vehicles with the aim of ensuring safe braking performance under normal and emergency driving conditions. RBS can be considered a service brake system under FMVSS 135 if the RBS acts on all wheels of the vehicle, is automatically activated, cannot be deactivated by a driver, can be activated in all transmission positions, and an ABS of the vehicle can control the RBS.

In some embodiments, RBS may also be used as the main actuators for chassis control systems such as electronic stability control (ESC), anti-lock braking systems (ABS), traction control systems (TCS). In some embodiments, parking brakes for the vehicle may be placed in the front.

Such embodiments provide a number of advantages over conventional systems. For example, embodiments described herein provide for cost savings and mass savings, highly-efficient energy recuperation which may partially relieve range anxiety, simple packaging in the rear axle which makes room available for other important parts, better chassis control performance (e.g., no hydraulic pulsation during ABS), and less wear and tear of friction brake components and tires.

Some embodiments described herein present a number of challenges. For example, when a battery status does not support large regenerative torque, excessive energy may be created which may require dissipation. In some embodiments, capacity may be reserved and may be hidden in the battery for regenerative braking. In some embodiments, super capacity or energy dissipation devices may be used.

In some cases, redundancy may be implemented in the service brake system for failsafe operation. In the rare event that all motors in the vehicle simultaneously do not function and regenerative braking ability is totally lost, the front friction brakes utilizing either hydraulic energy may be utilized. In some scenarios, a separate electric power source or a parking brake may automatically be activated in some scenarios.

The present disclosure differs from conventional systems in that the presently disclosed system (1) does not require rear hydraulic friction brakes: the whole rear brake pads, calipers, rotors can be eliminated or downsized; (2) the regenerative braking (E-brake) capability may be fully exploited first until above certain deceleration threshold when the front friction brakes need to be involved; and (3) wheel slip control is realized by regenerative braking torques alone instead of hydraulic brake pressure regulation (hence, traditional ABS valves are no longer needed; the front friction brakes only provide steady braking torques).

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. The vehicle 100 may include a frame 104 and one or more body panels 108 mounted or affixed thereto. The vehicle 100 may include one or more interior components (e.g., components inside an interior space 150, or user space, of the vehicle 100, etc.), exterior components (e.g., components outside of the interior space 150, or user space, of the vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, and Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

Figure 2:
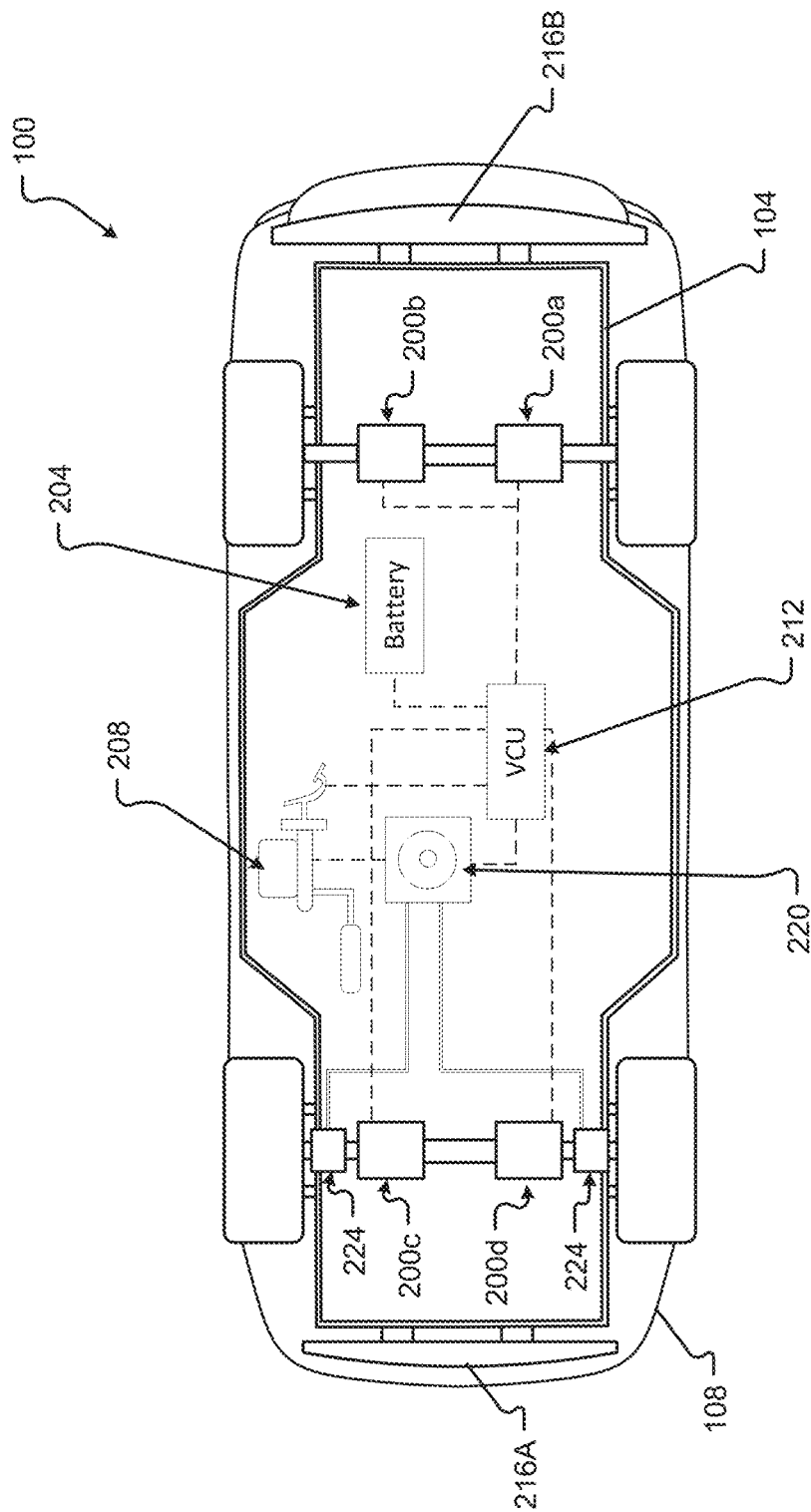
FIG. 2 is an illustration of a vehicle in accordance with one or more embodiments of the present disclosure.

FIG. 2 shows a perspective of a vehicle 100 which may include a four-motor architecture with electro-hydraulic braking (EHB) brake-by-wire (BbW) in the front wheels. In the front 216A of the vehicle 100, front wheels may be braked using an electro-hydraulic braking (EHB) brake-by-wire (BbW) system 220 controlled with electric motors on caliper (MoC) 224 as well as regenerative braking using motors 200c, 200d. In the rear 216B of the vehicle 100, rear wheels may be braked using only regenerative braking with motors 200a, 200b. The vehicle 100 may be an electric vehicle and may be powered via a battery 204. The braking systems described herein, and other systems of the vehicle may be controlled via a vehicle control unit (VCU) 212.

Brakes may be activated upon detection of certain scenarios using sensors and/or upon detection of a depression of a pedal using a sensor 208.

As described herein, embodiments of the present disclosure may be used in both three-motor or four-motor architectures, in which each of the rear wheels of the vehicle are connected to a separate motor, and the front wheels are either connected to the same or separate motors. Each of the motors described herein may be on-board or in-wheel motors.

Braking systems as described herein may comprise one or more of brake-by-wire systems, regenerative braking systems (also referred to as regen brakes or RBS), and electric parking brake (EPB) devices. In the embodiments described herein, rear wheels of a vehicle are braked using only regenerative braking systems while front wheels are braked using one or more of regenerative brakes, friction brakes (FBs), brake-by-wire (BbW) devices, and electric parking brake (EPB) devices. Brake-by-wire devices may include one or more of wet BbW devices such as electro-hydraulic brakes (EHBs) or electric booster brakes (EBBs) and dry BbW devices such as electro-mechanical brakes (EMBs) with electric motors on caliper (MoC).

Presently disclosed systems provide many benefits over conventional systems. For example, by using only regenerative brakes on the rear wheels, both weight and cost are reduced. The systems and methods of braking as described herein also provide for better control performance and increased energy recuperation.

As illustrated in FIG. 3, certain embodiments of the present disclosure may implement one of two options.

A first configuration (Option 1) may consist of two front electric motors and two rear electric motors. Brake-by-wire braking may be used in the front only and may consist of one or more of electrohydraulic brakes (EHB) and electronic brake boosters (EBB). The main brakes for the vehicle in the first configuration may be regenerative brakes using the electric motors. Secondary braking may be implemented using the EHB and/or EBB in the front. ABS and/or ESC may be implemented with the regenerative braking function of the four electric motors. The front braking system may further include an electronic parking brake (EPB). In summary, the front braking of a vehicle under the first configuration may include regenerative braking, EHB and/or EBB, and EPB, and the rear braking may include only the regenerative braking capabilities of the rear motors. The first configuration provides for redundancy as well as extremely capable and ready hardware.

A second configuration (Option 2) may provide for a simpler solution. In the second configuration, one or two motors may be used to power the front wheels while each of the rear wheels may be powered by independent motors. In the front, an electromechanical braking (EMB) system using a motor on caliper (MoC) may be implemented using brake-by-wire. Like the first configuration, the main braking may be performed using only regenerative braking capabilities of the three or four motors of the vehicle. Secondary braking for a vehicle in the second configuration may be implemented using the EMB front braking system. The EMB front braking system may also be used as a parking brake. ABS and/or ESC for the vehicle may be implemented using a combination of the front MoC as well as regenerative braking with the two rear motors. In summary, the front braking of a vehicle under the second configuration may include regenerative braking and EMB while the rear braking may include only the regenerative braking capabilities of the rear motors. The second configuration provides for a simpler design which may be cheaper and easier to manufacture.

Figure 4:
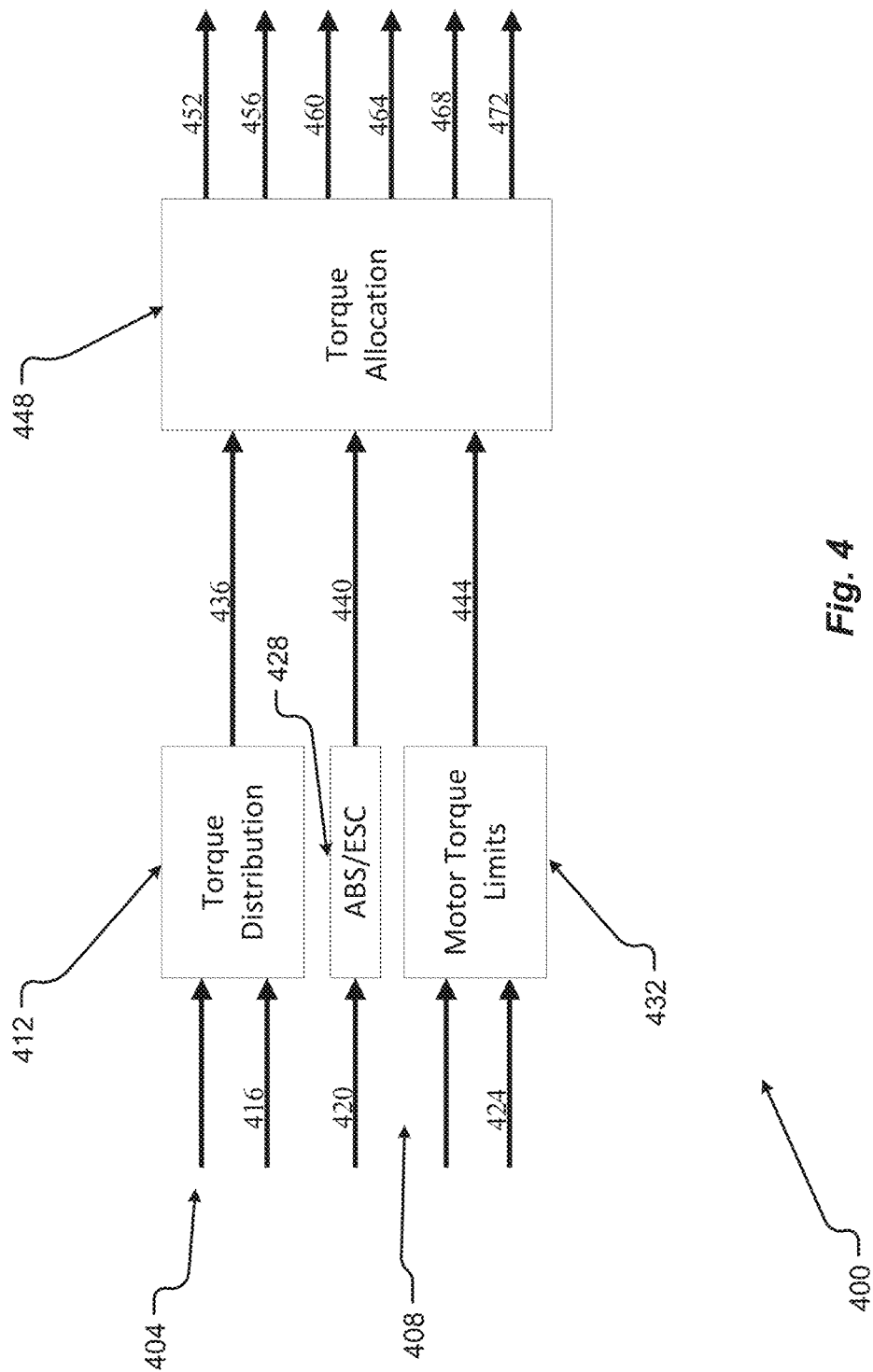
FIG. 4 is an illustration of a control system in accordance with one or more embodiments of the present disclosure.

As illustrated in FIG. 4, a braking control system 400 of a vehicle with a braking system as described herein may output control signals 452, 456, 460, 464, 468, 472 to each of the brakes. For example, a front left motor torque command signal 452 may be output to a front left motor of the vehicle; a front right motor torque command signal 456 may be output to a front right motor of the vehicle; a rear left motor torque command signal 460 may be output to a rear left motor of the vehicle; a rear right motor torque command signal 464 may be output to a rear right motor of the vehicle; a front left friction torque command signal 468 may be output to a front left friction brake of the vehicle; and a front right friction torque command signal 472 may be output to a front right friction brake of the vehicle.

Each of the control signals 452, 456, 460, 464, 468, 472 may be output by a torque allocation control system 448 of the braking control system 400. The torque allocation control system 448 may accept as inputs one or more corner torque command signals 436, one or more control command signals 440, one or more torque limit control signals 444, and/or other control signals. The torque allocation control system 448 may be configured to process the one or more corner torque command signals 436, one or more control command signals 440, one or more torque limit control signals 444, and/or other control signals in order to properly control the overall braking system of the vehicle by outputting the control signals 452, 456, 460, 464, 468, 472.

The one or more corner torque command signals 436 may be output by a torque distribution system 412. Corner torque command signals 436 may be generated by the torque distribution system 412 through the processing of one or more of a commanded total brake torque signal 404 and various vehicle state signals 416 such as longitudinal acceleration, lateral acceleration, yaw rate, sideslip, roll rate, angular speed or velocity of one or more wheels, wheel rotations per minute (rpm) of one or more wheels, etc.

The one or more control command signals 440 may be output by an ABS/ESC system 428. The control command signals 440 may be generated by the ABS/ESC system 428 through the processing of one or more of various vehicle state signals 420 such as longitudinal acceleration, lateral acceleration, yaw rate, sideslip, roll rate, angular speed or velocity of one or more wheels, wheel rpm of one or more wheels, etc.

The one or more torque limit control signals 444 may be output by a motor torque limits control system 432. The torque limit control signals 444 may be generated by the motor torque limits control system 432 through the processing of one or more of torque limits sent to the motor torque limits control system 432 by one or more upstream controllers as well as one or more various vehicle state signals 424 such as longitudinal acceleration, lateral acceleration, yaw rate, sideslip, roll rate, angular speed or velocity of one or more wheels, wheel rpm of one or more wheels, etc.

Each of the braking control system 400, the torque allocation control system 448, the torque distribution system 412, the ABS/ESC system 428, and the motor torque limits control system 432 may be specialized hardware controllers, software systems executed by a processor of the vehicle, or a combination thereof.

Figure 5:
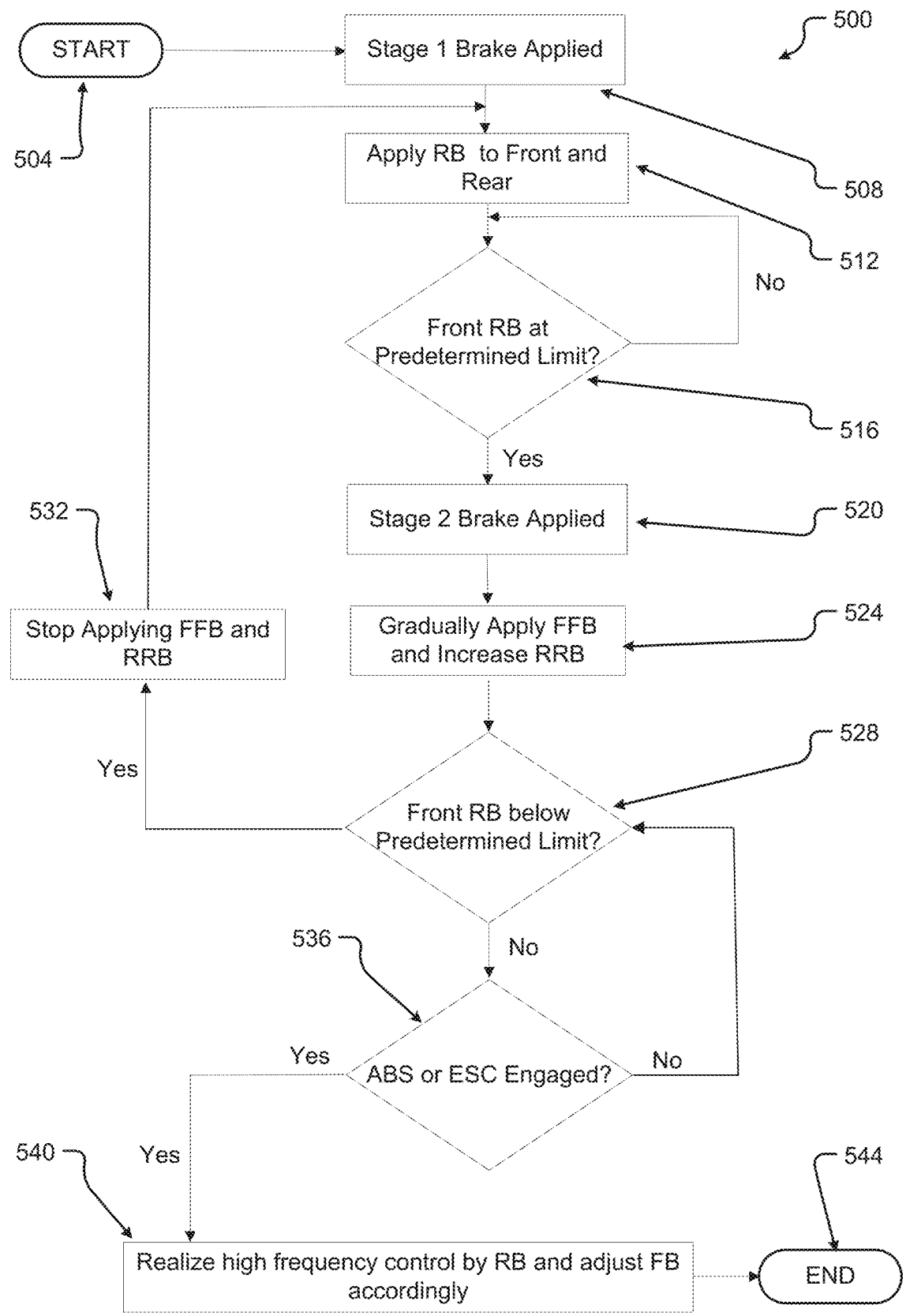
FIG. 5 is a flowchart of a method in accordance with one or more embodiments of the present disclosure.

In some embodiments and as shown in FIG. 5, a method 500 of controlling a braking system of a vehicle may be executed by a control system of the vehicle with one of the braking system configurations as described herein. The method may begin at step 504 in which the vehicle with one of the braking system configurations as described herein is traveling at a velocity. At step 508, a first stage of braking may be applied. The first stage of braking may be applied upon one or more of a user, such as a driver, of the vehicle applying a brake pedal or an automated driving system of the vehicle detecting a scenario in which braking, i.e., additional deceleration, may be necessary.

In step 512, after the first stage of braking has been applied, regenerative braking systems may be applied to both the front and rear motors of the vehicle. As described herein, a vehicle may have two rear motors and one or two front motors. Each of the motors of the vehicle may be configured to be capable of operating in a regenerative braking mode.

As the regenerative braking systems are applied to the front and rear motors, the control system may monitor the front regenerative braking systems. The control system may be capable of sensing and/or determining a deceleration of the vehicle, a distance of depression of a brake pedal of the vehicle, a front braking force, and a rear braking force. The control system may further be capable of normalizing the front and/or rear braking force based on the weight of the vehicle.

The control system of the vehicle may be capable of determining if and when the front regenerative braking systems have reached a maximum braking force. In some embodiments, a predetermined limit of braking force may be used. The control system may monitor the force applied by the front regenerative braking and determine whether the front regenerative braking is at a maximum predetermined limit at step 516. If the control system determines the front regenerative braking has not yet reached its maximum predetermined limit, the control system may continue monitoring the front regenerative braking.

When the control system determines the front regenerative braking has reached its maximum predetermined limit, the control system may apply a second stage of braking at step 520 in which front friction brakes may be blended in to increase the braking power. In the second stage of braking, the front regenerative braking system may be held at its maximum force while the rear regenerative braking may continue to increase. At step 524, the control system may gradually apply the front friction brakes (FFB) and increase the rear regenerative brakes (RRB). Much of the braking power in the second stage may be provided by the front friction brakes.

In the second stage of braking, the control system may again monitor the force applied by the front regenerative braking and determine whether the front regenerative braking is below its maximum predetermined limit at step 528.

When the control system determines the front regenerative braking has dropped below its maximum predetermined limit, the control system may, in step 532, cease applying the FFB and/or RRB and return to the first stage of braking.

If the control system determines the front regenerative braking has not dropped below its maximum predetermined limit, the control system may next determine whether one or both of ABS and ESC is engaged. If neither the ABS nor the ESC is engaged, the control system may return to step 528 in which the front regenerative braking system is monitored.

If, on the other hand, one or both of the ABS and the ESC is engaged, the control system may determine that high frequency control has been realized by the rear brakes and the control system may adjust the front braking accordingly in step 540. The method 500 may end at step 544.

Figure 6:
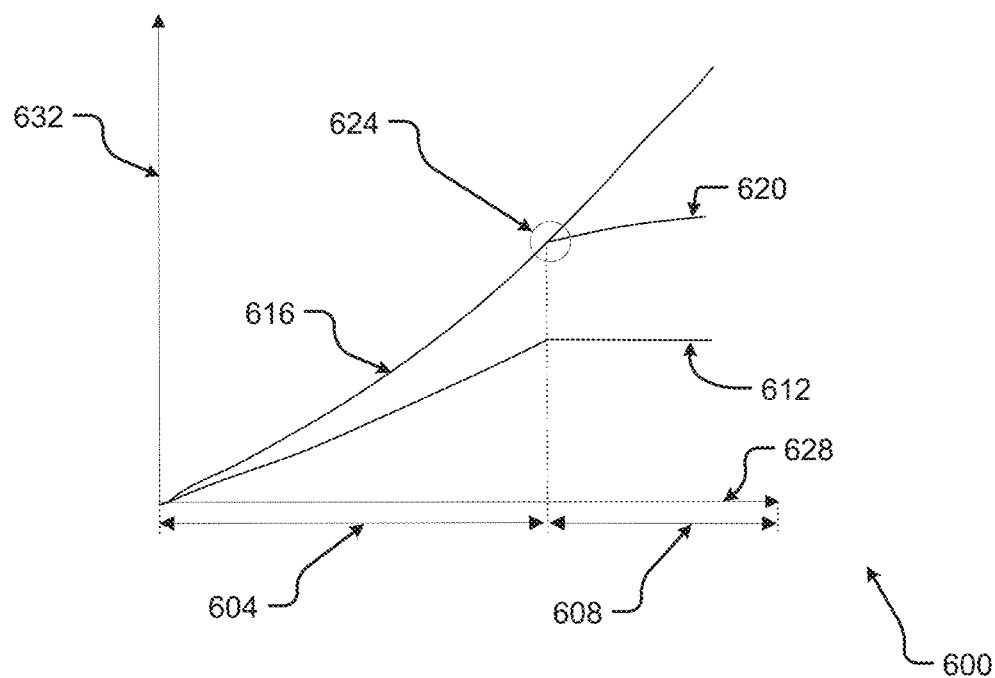
FIGS. 6 and 7 are charts illustrating aspects of one or more embodiments of the present disclosure.
Figure 7:
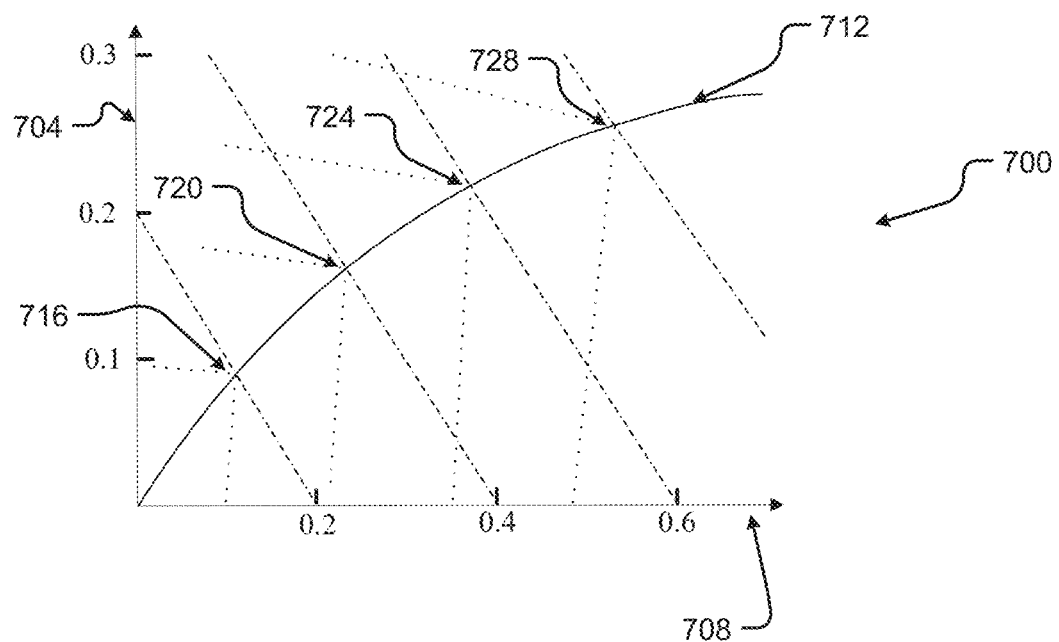

The braking strategy of the method 500 described above may be in accordance with the charts 600, 700 illustrated in FIGS. 6 and 7. In the chart 600 of FIG. 6, the x-axis 628 represents a distance travelled of a brake pedal in the vehicle. For example, a brake pedal may have a range of zero to sixty millimeters. If the brake pedal is depressed slightly by a driver, the pedal may travel a relatively low distance which may represent the driver seeks to brake slightly. If the brake pedal is depressed significantly by the driver, the pedal may travel a relatively high distance which may represent the driver seeks to brake at a high rate. Points at the right end of the x-axis 628 represent points at which the brake pedal has travelled a further distance as compared to points at the left end of the x-axis 628.

The y-axis 632 represents a rate of deceleration of the vehicle. Points higher along the y-axis 632 represent points at which the vehicle is decelerating at a higher rate as compared to points lower along the y-axis 632.

The deceleration of the vehicle during the braking strategy associated with the method 500 described above is represented by the line 616. The first stage of braking is in the left portion of the chart 600 represented by line 604. In this portion of the chart 600, only the regenerative brakes of the vehicle are used. The lower line 612 represents the braking force of the front regenerative brakes while the distance between the lines 616 and 612 from the y-axis 632 to the point 624 represents the braking force of the rear regenerative brakes. As can be appreciated, as the brake pedal is increasingly depressed the deceleration, represented by the line 616, increases.

At point 624, the front regenerative braking reaches a maximum or otherwise predetermined limit and a second stage of braking represented by the line 608 initiates. Beyond point 624, in the right side of the chart 600 when the pedal is depressed to a relatively further position, the front regenerative braking system ceases to be increased, represented by the flat, horizontal portion of line 612. In this second stage of braking, the rear regenerative braking system increases at a lesser rate reflected by line 620 to the right of the point 624. To supplement the braking at this point, front friction brakes may be activated—reflected by the portion of line 616 to the right of the point 624.

The braking strategy of the method 500 described above may also be in accordance with the chart 700 illustrated in FIG. 7. In the chart 700, the horizontal x-axis 708 represents a braking force of the front brakes of the vehicle and the vertical y-axis 704 represents a braking force of the rear brakes of the vehicle. The optimum curve of braking for the vehicle is reflected by line 712. Above the optimum curve of braking, it can be expected that the rear braking system could lock which could result in the vehicle becoming unstable. Below the optimum curve of braking, it can be expected that the front braking system could lock which may have a lesser chance of resulting in the vehicle becoming unstable and the vehicle may be predicted to remain stable.

The line 712 is divided into a number of sections separated by points 716, 720, 724, 728 for purpose of illustrations. These points 716, 720, 724, 728 may, for example, be rates of deceleration. For the purpose of explanation and to serve only as an example, gravitational (g) values will be used. These g values of deceleration should not be considered as limiting in any way. In this example, a first point 716 along the line 712 indicates a point at which the deceleration of the vehicle reaches 0.2 g. A second point 720 along the line 712 indicates a point at which the deceleration of the vehicle reaches 0.4 g. A third point 724 along the line 712 indicates a point at which the deceleration of the vehicle reaches 0.2 g. A fourth point 728 along the line 712 indicates a point at which the deceleration of the vehicle reaches 0.2 g.

FIG. 8 illustrates various states of a vehicle during an exemplary braking scenario in accordance with one or more of the embodiments described herein. In each of the charts 800, 801, 802, 803, time is plotted on a horizontal x-axis and a state of the vehicle is plotted on a vertical y-axis. Vertical lines 893-899 are provided through each of the charts 800, 801, 802, 803 for reference.

In chart 800, speed is plotted on the vertical y-axis 868 and time on the horizontal x-axis 872. The speed of the vehicle is plotted with relation to time by line 880. A horizontal line 876 is provided for illustration purposes only.

In chart 801, acceleration is plotted on the vertical y-axis 852 and time on the horizontal x-axis 856. The acceleration of the vehicle is plotted with relation to time by line 864. A horizontal line 860 is provided for illustration purposes only.

In chart 802, torque is plotted on the vertical y-axis 828 and time on the horizontal x-axis 832. The torque for each of front regenerative braking, rear regenerative braking, and front friction braking of the vehicle is plotted with relation to time by lines 840, 844, 848, where line 840 represents front friction braking torque, line 844 represents rear regenerative braking torque, and line 848 represents front regenerative braking torque. A horizontal line 836 is provided for illustration purposes only. Note that at the right side of the chart 802, in which the vehicle is travelling at a lower speed, the front regenerative braking torque represented by line 848 and the rear regenerative braking torque represented by line 844 rise while the front friction braking torque represented by line 840 falls. In this way, when the vehicle is at a low speed, slow speed blending may be initiated in which the front friction braking drops to a low rate and the regenerative braking for both the front and rear is blended to a same rate.

In chart 803, adhesion utilization for the front and rear brakes is plotted on the vertical y-axis 804 and time on the horizontal x-axis 812. The adhesion utilization for the front and rear brakes of the vehicle is plotted with relation to time by lines 820, 824, where line 824 represents the adhesion utilization for the front brakes and line 820 represents adhesion utilization for the rear brakes A horizontal line 816 is provided for illustration purposes only.

In the exemplary braking scenario illustrated in charts 800, 801, 802, 803, the vehicle travels at a relatively constant speed leading up to line line 894. Just before line 894, the vehicle begins to decelerate. During this period of deceleration, as can be appreciated by chart 802, the front and rear regenerative braking systems activate. When the front regenerative braking, represented by line 848, reaches a predetermined maximum torque, the front friction braking torque, represented by line 840 begins.

Between lines 894 and 895, the deceleration of the vehicle is held at a constant rate. Beginning line 88S at line 895, the deceleration of the vehicle decreases and the vehicle travels at a constant speed. As can be appreciated by chart 802, the front friction braking torque and the rear regenerative braking torque begins to rise while the front regenerative braking torque remains at the predetermined maximum level until the front friction braking torque ceases changing.

In accordance with the systems and methods described herein, an electric vehicle braking system may comprise a front braking system and a rear braking system. The front braking system may comprise a front-wheel friction brake that selectively applies a pressure from a friction pad to a rotary disk associated with a front wheel of an electric vehicle and a braking controller. The braking controller may be configured to selectively applies a first voltage to a front electric motor associated with the front wheel of the electric vehicle. The braking controller cuts off the first voltage to the front electric motor of the electric vehicle when a deceleration is detected by the braking controller.

The rear braking system of the vehicle may exclude a rear-wheel friction brake while the braking controller may be further configured to selectively apply a second voltage to a rear electric motor associated with a rear wheel of the vehicle. The braking controller may be configured to cut off the second voltage to the rear electric motor of the rear braking system excluding the rear-wheel friction brake and apply the front-wheel friction brake only upon reaching a predetermined braking force threshold.

In accordance with the embodiments described herein, an electric vehicle may include an electrical vehicle braking system comprising a braking controller, a front braking system, and a rear braking system.

The front braking system may comprise one or more front-wheel friction brakes that selectively apply a pressure from a friction pad to a rotary disk associated with one or both of the front wheels of the vehicle. For example, a separate friction brake may be used on each of the front wheels.

The front braking system may further comprise one or two front electric motors associated with the front wheels of the vehicle. For example, in some configurations a single motor may power both of the front wheels, while in other configurations each front wheel may be powered by a separate motor. The motors powering the front wheels may be capable of being used as part of a front regenerative braking system. For example, resistance may be added to the motors to cause the motors to slow the wheels and cause deceleration. Power may be gained through this process. Power gained through regenerative braking may be added to the battery powering the vehicle.

The rear braking system may comprise two rear electric motors associated with the rear wheels of the vehicle. In some embodiments, the rear braking system does not include any friction brakes. For example, each of the rear wheels may be powered by a separate motor. The motors powering the rear wheels may be capable of being used as part of a rear regenerative braking system. For example, resistance may be added to the motors to cause the motors to slow the wheels and cause deceleration. Power may be gained through this process.

The braking of the vehicle may be controlled via a braking controller of the vehicle. The braking controller may be a hardware device or may be a process executed by a processor of the vehicle. The braking controller may be capable of determining braking is required and may be configured to operate both regenerative braking and the front friction brakes of the vehicle. For example, the braking controller may be capable of detecting a brake pedal being depressed or of receiving instructions from an autonomous driving controller to decelerate the vehicle.

The braking controller may be capable of being used to operate the front friction brakes and the front and rear regenerative braking in the two braking stages described herein. In some embodiments, the braking controller may be configured to detect a force or amount of torque being applied by the front regenerative braking. The braking controller may have access to memory storing a value associated with a threshold or maximum amount of force, or torque, to which the front regenerative braking should be limited.

The braking controller may be capable of detecting an amount of deceleration required. For example, the braking controller may be capable of detecting a distance the brake pedal has been depressed or of receiving instructions from an autonomous driving controller to alter a rate of deceleration of the vehicle. In this way, the braking controller may be capable of detecting whether additional deceleration is required, whether the vehicle should maintain its rate of deceleration or whether the vehicle should accelerate.

In response to a detection that the front regenerative braking has reached the maximum force and to a detection that additional deceleration is required, the braking controller may be configured to apply the front-wheel friction brake in such a way that the front-wheel friction brake is not activated if the front regenerative braking is not at its maximum force or torque. As such the braking controller may be capable of following a specific braking strategy such as the two stage strategy described herein.

For example, in a first stage the braking controller may be configured to detect a deceleration request and, in response to the detection of the deceleration request, initiate regenerative braking using the front electric motor and the two electric motors. The braking controller may monitor an amount of one or more of force and torque associated with the front electric motor. The braking controller may apply the front and the rear regenerative braking following an optimum braking distribution curve.

In the first stage, the braking controller may detect that the amount of the one or more of force and torque associated with the front electric motor reaches the threshold or maximum amount and, in response, initiate a second stage.

In the second stage, the braking controller may gradually apply the front friction brake, increase the rear regenerative braking, and maintain the front regenerative braking at the threshold or maximum amount. The braking controller may also be capable of detecting a request for a reduction in deceleration and, in response, reducing the front and rear regenerative braking. If the braking controller detects the front friction brake is no longer applied, it may end the second stage of braking and either return to the first stage or cease braking altogether.

Any of the steps, functions, and operations discussed herein can be performed continuously and automatically.

The exemplary systems and methods of this disclosure have been described in relation to a braking controller of an electric vehicle with front and rear braking systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments of braking systems and methods illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the braking elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include an electric vehicle braking system comprising: a braking controller; a front braking system comprising: a front-wheel friction brake that selectively applies a pressure from a friction pad to a rotary disk associated with a first front wheel of an electric vehicle; and a front electric motor associated with the first front wheel of the electric vehicle, wherein the braking controller is configured to utilize the front electric motor to implement front regenerative braking; and a rear braking system comprising two rear electric motors and excluding a friction brake, wherein the braking controller is configured to utilize the two rear electric motors to implement rear regenerative braking, wherein the braking controller is further configured to: detect the front regenerative braking has reached a maximum force; detect additional deceleration is required; and in response to detecting the front regenerative braking has reached the maximum force and detecting additional deceleration is required, apply the front-wheel friction brake.

Aspects of the above electric vehicle braking system include wherein the front regenerative braking and the rear regenerative braking form a main service brake, wherein the front-wheel friction brake is not activated if the front regenerative braking is not at the maximum force.

Aspects of the above electric vehicle braking system include wherein in a first stage the braking controller: detects a deceleration request; in response to the detection of the deceleration request initiates regenerative braking using the front electric motor and the two electric motors; and monitors an amount of one or more of force and torque associated with the front electric motor.

Aspects of the above electric vehicle braking system include wherein in the first stage the braking controller: detects the amount of the one or more of force and torque associated with the front electric motor reaches a threshold; and in response to detecting the amount of the one or more of force and torque associated with the front electric motor reaches the threshold, initiates a second stage.

Aspects of the above electric vehicle braking system include wherein in the second stage the braking controller: gradually applies the front friction brake; increases the rear regenerative braking; and maintains the front regenerative braking at the threshold.

Aspects of the above electric vehicle braking system include wherein in the second stage the braking controller: detects a request for a reduction in deceleration; in response to detection the request for the reduction in deceleration, reduces the front friction brake and reduces the rear regenerative braking; detects the front friction brake is no longer applied; and in response to detecting the front friction brake is no longer applied, ends the second stage of braking.

Aspects of the above electric vehicle braking system include wherein in the first stage the braking controller applies the front regenerative braking and the rear regenerative braking following an optimum braking distribution curve.

Embodiments include an electric vehicle comprising: a processor; and a computer-readable storage medium storing computer-readable instructions which, when executed by the processor, cause the processor to execute a braking controller of the vehicle, wherein the braking controller is configured to: control a front-wheel friction brake of the vehicle by selectively applying a pressure from a friction pad to a rotary disk associated with a first front wheel of the vehicle; control a front electric motor associated with the first front wheel of the vehicle; control a rear braking system comprising two rear electric motors and excluding a friction brake; utilize the front electric motor to implement front regenerative braking; utilize the two rear electric motors to implement rear regenerative braking; detect the front regenerative braking has reached a maximum force; detect additional deceleration is required; and in response to detecting the front regenerative braking has reached the maximum force and detecting additional deceleration is required, apply the front-wheel friction brake.

Aspects of the above electric vehicle include wherein the front regenerative braking and the rear regenerative braking form a main service brake, wherein the front-wheel friction brake is not activated if the front regenerative braking is not at the maximum force.

Aspects of the above electric vehicle include wherein in a first stage the braking controller: detects a deceleration request; in response to the detection of the deceleration request initiates regenerative braking using the front electric motor and the two electric motors; and monitors an amount of one or more of force and torque associated with the front electric motor.

Aspects of the above electric vehicle include wherein in the first stage the braking controller: detects the amount of the one or more of force and torque associated with the front electric motor reaches a threshold; and in response to detecting the amount of the one or more of force and torque associated with the front electric motor reaches the threshold, initiates a second stage.

Aspects of the above electric vehicle include wherein in the second stage the braking controller: gradually applies the front friction brake; increases the rear regenerative braking; and maintains the front regenerative braking at the threshold.

Aspects of the above electric vehicle include wherein in the second stage the braking controller: detects a request for a reduction in deceleration; in response to detection the request for the reduction in deceleration, reduces the front friction brake and reduces the rear regenerative braking; detects the front friction brake is no longer applied; and in response to detecting the front friction brake is no longer applied, ends the second stage of braking.

Aspects of the above electric vehicle include wherein in the first stage the braking controller applies the front regenerative braking and the rear regenerative braking following an optimum braking distribution curve.

Embodiments include a computer program product comprising: a non-transitory computer readable storage medium having computer readable program code embodied therewith, the computer readable program code configured, when executed by a processor, to execute a braking controller of a vehicle, wherein the braking controller is configured to: control a front-wheel friction brake of the vehicle by selectively applying a pressure from a friction pad to a rotary disk associated with a first front wheel of the vehicle; control a front electric motor associated with the first front wheel of the vehicle; control a rear braking system comprising two rear electric motors and excluding a friction brake; utilize the front electric motor to implement front regenerative braking; utilize the two rear electric motors to implement rear regenerative braking; detect the front regenerative braking has reached a maximum force; detect additional deceleration is required; and in response to detecting the front regenerative braking has reached the maximum force and detecting additional deceleration is required, apply the front-wheel friction brake.

Aspects of the above computer program product include wherein the front regenerative braking and the rear regenerative braking form a main service brake, wherein the front-wheel friction brake is not activated if the front regenerative braking is not at the maximum force.

Aspects of the above computer program product include wherein in a first stage the braking controller: detects a deceleration request; in response to the detection of the deceleration request initiates regenerative braking using the front electric motor and the two electric motors; and monitors an amount of one or more of force and torque associated with the front electric motor.

Aspects of the above computer program product include wherein in the first stage the braking controller: detects the amount of the one or more of force and torque associated with the front electric motor reaches a threshold; and in response to detecting the amount of the one or more of force and torque associated with the front electric motor reaches the threshold, initiates a second stage.

Aspects of the above computer program product include wherein in the second stage the braking controller: gradually applies the front friction brake; increases the rear regenerative braking; and maintains the front regenerative braking at the threshold.

Aspects of the above computer program product include wherein in the second stage the braking controller: detects a request for a reduction in deceleration; in response to detection the request for the reduction in deceleration, reduces the front friction brake and reduces the rear regenerative braking; detects the front friction brake is no longer applied; and in response to detecting the front friction brake is no longer applied, ends the second stage of braking.

Aspects of the above computer program product include wherein in the first stage the braking controller applies the front regenerative braking and the rear regenerative braking following an optimum braking distribution curve.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. An electric vehicle braking system comprising:
   a braking controller;
   a front braking system comprising:
   a front-wheel friction brake that selectively applies a force to a first front wheel of an electric vehicle; and
   a front electric motor associated with the first front wheel of the electric vehicle, wherein the braking controller is configured to utilize the front electric motor to implement front regenerative braking; and
   a rear braking system comprising two rear electric motors and excluding a friction brake, wherein the braking controller is configured to utilize the two rear electric motors to implement rear regenerative braking,
   wherein the braking controller is further configured to:
   detect that additional deceleration is required;
   after detecting that additional deceleration is required, detect that the front regenerative braking is at one or more of a threshold force and a maximum force based on one or more of a threshold force value and a maximum force value stored in memory; and
   in response to detecting that additional deceleration is required and the front regenerative braking has reached the one or more of the threshold force and the maximum force, apply the front-wheel friction brake,
   wherein, in a first stage of braking, the braking controller:
   monitors an amount of force applied with the front electric motor; and
   in response to detecting that the amount of the force applied with the front electric motor reaches the threshold force, initiates a second stage of braking, and
   wherein, in the second stage of braking, the braking controller:
   gradually applies the front-wheel friction brake;
   increases the rear regenerative braking;
   maintains the front regenerative braking at the threshold force;
   detects a request for a reduction in deceleration;
   in response to detecting the request for the reduction in deceleration, reduces the front-wheel friction brake and reduces the rear regenerative braking;
   detects that the front-wheel friction brake is no longer applied; and
   in response to detecting that the front-wheel friction brake is no longer applied, ends the second stage of braking.

2. The electric vehicle braking system of claim 1, wherein the front regenerative braking and the rear regenerative braking form a main service brake, wherein the front-wheel friction brake is not activated if the front regenerative braking is not at the maximum force.

3. The electric vehicle braking system of claim 1, wherein in the first stage the braking controller:
   detects a deceleration request;
   in response to detecting the deceleration request, initiates regenerative braking using the front electric motor and the two rear electric motors; and
   monitors the amount of force applied with the front electric motor.

4. The electric vehicle braking system of claim 1, wherein in the first stage the braking controller applies the front regenerative braking and the rear regenerative braking following an optimum braking distribution curve.

5. An electric vehicle comprising:
   a processor; and
   a computer-readable storage medium storing computer-readable instructions which, when executed by the processor, cause the processor to execute a braking controller of the electric vehicle, wherein the processor is configured to:
   control a front-wheel friction brake of the electric vehicle by selectively applying a force to a first front wheel of the electric vehicle;
   control a front electric motor associated with the first front wheel of the electric vehicle;
   control a rear braking system comprising two rear electric motors and excluding a friction brake;
   utilize the front electric motor to implement front regenerative braking;
   utilize the two rear electric motors to implement rear regenerative braking;
   detect that additional deceleration is required;
   after detecting that additional deceleration is required, detect that the front regenerative braking is at one or more of a threshold force and a maximum force based on one or more of a threshold force value and a maximum force value stored in memory; and
   in response to detecting that additional deceleration is required and the front regenerative braking has reached the one or more of the threshold force and the maximum force, apply the front-wheel friction brake, wherein, in a first stage of braking, the braking controller:
monitors an amount of force applied with the front electric motor; and
in response to detecting that the amount of the force applied with the front electric motor reaches the threshold force, initiates a second stage of braking, and
wherein, in the second stage of braking, the braking controller:
gradually applies the front-wheel friction brake;
increases the rear regenerative braking;
maintains the front regenerative braking at the threshold force;
detects a request for a reduction in deceleration;
in response to detecting the request for the reduction in deceleration, reduces the front-wheel friction brake and reduces the rear regenerative braking;
detects that the front-wheel friction brake is no longer applied; and
in response to detecting that the front-wheel friction brake is no longer applied, ends the second stage of braking.

6. The electric vehicle of claim 5, wherein the front regenerative braking and the rear regenerative braking form a main service brake, wherein the front-wheel friction brake is not activated if the front regenerative braking is not at the maximum force.

7. The electric vehicle of claim 5, wherein in the first stage the braking controller:
detects a deceleration request;
in response to detecting the deceleration request, initiates regenerative braking using the front electric motor and the two rear electric motors; and
monitors the amount of force applied with the front electric motor.

8. The electric vehicle of claim 5, wherein in the first stage the braking controller applies the front regenerative braking and the rear regenerative braking following an optimum braking distribution curve.

9. A computer program product comprising:
a non-transitory computer readable storage medium having computer readable program code embodied therewith, the computer readable program code configured, when executed by a processor, to execute a braking controller of a vehicle, wherein the braking controller is configured to:
control a front-wheel friction brake of the vehicle by selectively applying a force to a first front wheel of the vehicle;
control a front electric motor associated with the first front wheel of the vehicle;
control a rear braking system comprising two rear electric motors and excluding a friction brake;
utilize the front electric motor to implement front regenerative braking;
utilize the two rear electric motors to implement rear regenerative braking;
detect that additional deceleration is required;
after detecting that additional deceleration is required, detect that the front regenerative braking is at one or more of a threshold force and a maximum force based on one or more of a threshold force value and a maximum force value stored in memory; and
in response to detecting that additional deceleration is required and the front regenerative braking has reached the one or more of the threshold force and the maximum force, apply the front-wheel friction brake,
wherein, in a first stage of braking, the braking controller:
monitors an amount of force applied with the front electric motor; and
in response to detecting that the amount of the force applied with the front electric motor reaches the threshold force, initiates a second stage of braking, and
wherein, in the second stage of braking, the braking controller:
gradually applies the front-wheel friction brake;
increases the rear regenerative braking;
maintains the front regenerative braking at the threshold force;
detects a request for a reduction in deceleration;
in response to detecting the request for the reduction in deceleration, reduces the front-wheel friction brake and reduces the rear regenerative braking;
detects that the front-wheel friction brake is no longer applied; and
in response to detecting that the front-wheel friction brake is no longer applied, ends the second stage of braking.

10. The computer program product of claim 9, wherein the front regenerative braking and the rear regenerative braking form a main service brake, wherein the front-wheel friction brake is not activated if the front regenerative braking is not at the maximum force.

11. The computer program product of claim 9, wherein in the first stage the braking controller:
detects a deceleration request;
in response to detecting the deceleration request, initiates regenerative braking using the front electric motor and the two rear electric motors; and
monitors the amount of force applied with the front electric motor.

* * * * *

UNITED STATES PATENT AND TRADEMARK OFFICE
CERTIFICATE OF CORRECTION

PATENT NO. : 11,634,033 B2
APPLICATION NO. : 16/781736
DATED : April 25, 2023
INVENTOR(S) : Xiaoyu Huang et al.

It is certified that error appears in the above-identified patent and that said Letters Patent is hereby corrected as shown below:

On the Title Page

- Item (71) "Applicant", Column 1, Line 6, please delete "Anhui" and insert -- Hefei --, therefore.

- Item (73) "Assignee", Column 1, Line 12, please delete "Heifei" and insert -- Hefei --, therefore.

Signed and Sealed this
Thirteenth Day of June, 2023

Katherine Kelly Vidal
*Director of the United States Patent and Trademark Office*